Oct. 25, 1949.　　　　B. G. CARLSON　　　　2,485,813
COMPRESSOR-TURBINE ENGINE
Filed April 30, 1945　　　　2 Sheets-Sheet 2
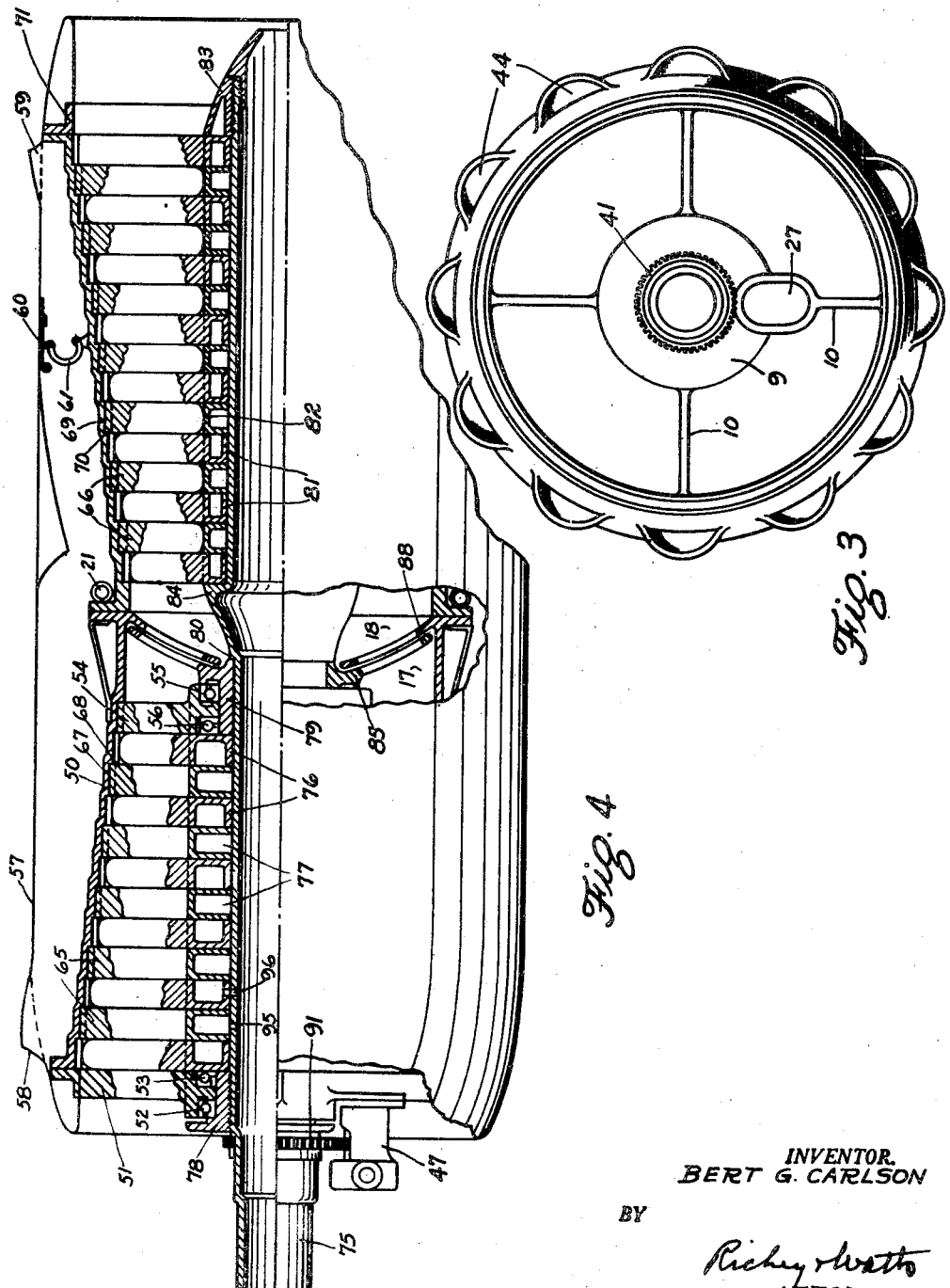
INVENTOR.
BERT G. CARLSON
BY
Richey Watts
ATTORNEYS Patented Oct. 25, 1949

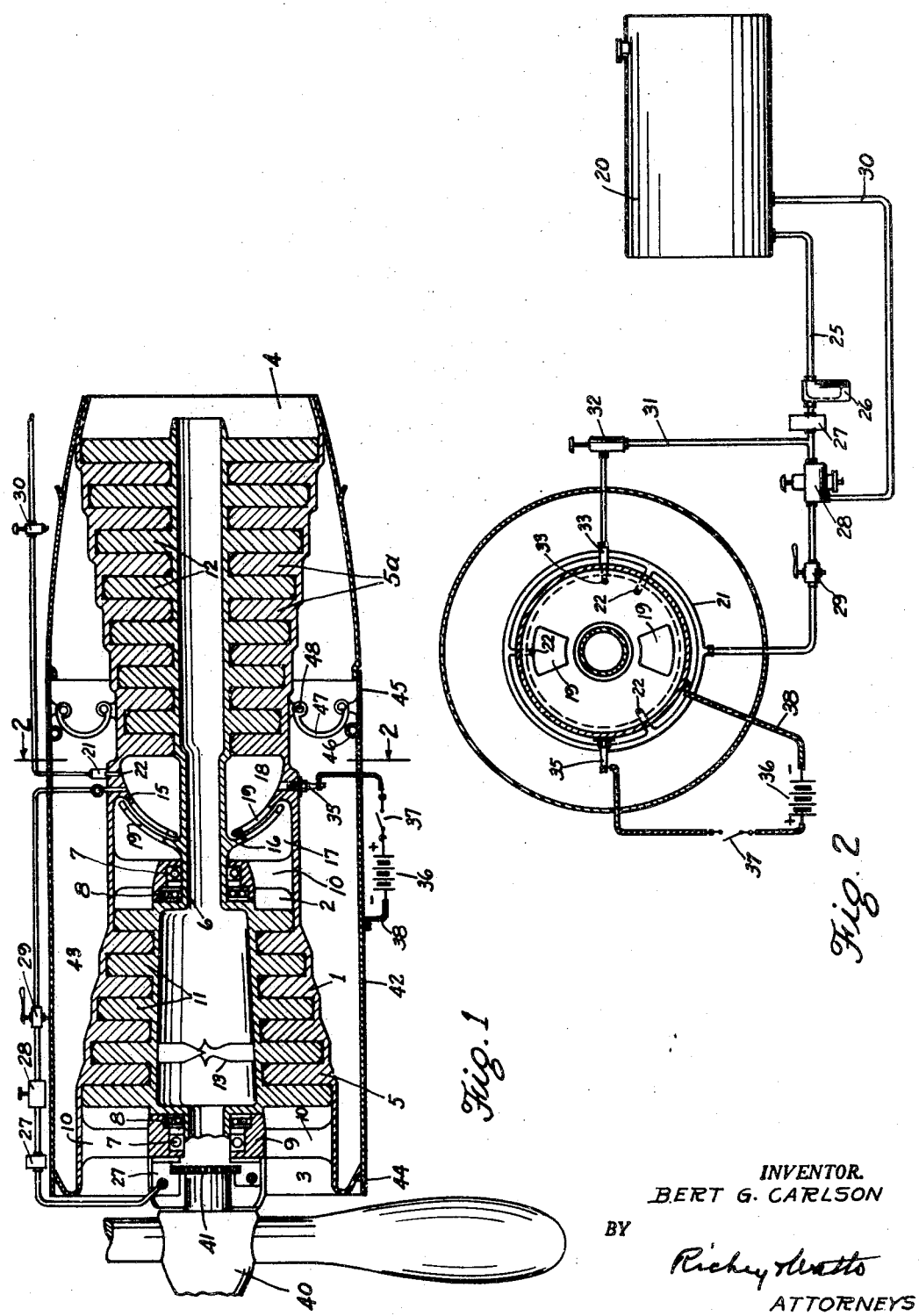

2,485,813

UNITED STATES PATENT OFFICE 2,485,813

COMPRESSOR-TURBINE ENGINE

Bert G. Carlson, Gates Mills, Ohio

Application April 30, 1945, Serial No. 591,145

6 Claims. (Cl. 60—41)

The present invention relates generally to engines of the combined compressor-turbine type, and more particularly to engines of this type having novel compression and explosion chamber construction and greatly improved efficiency.

Heretofore engines have been proposed in which a gas turbine and compressor were axially mounted on a common shaft within a housing. The compressor drew air into the housing and forced it into a combustion space between the compressor and turbine. Fuel was introduced into that space and ignited and the heated gases were passed thru the turbine and rotated the shaft and compressor. The air which was delivered into the combustion space was not highly compressed, particularly at the lower rotational speeds of the shaft, and about half of the expansive forces of the burning gases was opposed to the flow of air thru the compressor. The efficiency of these engines was relatively low, on the order of possibly 35%. As the rotational speed of the shaft increased the rate of flow of air increased with corresponding increase in back pressure on the air and, as a result, the efficiency increased only to a limited extent over that at the lower speeds.

Moreover, these engines require auxiliary equipment for starting. When the starter was mounted on the vehicle, it added to the weight of the vehicle and occupied space which could have been used for other purposes, and when the starter was kept on the ground, the vehicle engine could be started only where such a starter was available. Such an arrangement precludes starting the engine of an airplane while in flight.

Various proposals have been made to increase the efficiency and avoid other disadvantages of combined compressor-turbine engines but many of these proposals have involved complicated structures and high loss of efficiencies. So far as I know, none of these proposals has proven to be sufficiently efficient to be satisfactory for general use.

The present invention aims to provide a combined compression-turbine engine which is simple in construction, is highly efficient in operation, is easy to start without the aid of an auxiliary starter, is easy to control, is adequately cooled and may utilize either the rotational forces of the shaft or the jet propulsive forces of the gases or both of these forces. My invention provides an efficient compressor-turbine engine which may be used as a stationary engine or as a moving engine. When used as a moving engine, it may be coupled with an air or water screw so as to utilize the shaft rotating forces of the gases and also the jet propulsion effect of the gases. When used as a stationary engine, it utilizes only the shaft rotating forces of the gases.

An important feature of the present invention is the provision, between an air compressor and gas turbine, of an air compression chamber, an explosion chamber, and means for periodically connecting those chambers for flow of compressed air from the compressed air chamber into the explosion chamber. Other important features of the invention are the provision of a hollow shaft which may be cooled by the flow of air therethru; a shell surrounding the engine and defining therewith a space which may be cooled by the flow of air therethru; and the mounting of the shaft on bearings located in the relatively cool compressor.

The present invention will be better understood by those skilled in the art from the following description and the accompanying drawings which illustrate embodiments of the present invention and in which Figure 1 is a central, sectional view, partly in elevation of an airplane engine embodying one form of the present invention and equipped with an air screw;

Figure 2 is a transverse, sectional view taken on line 2—2 of Fig. 1 and showing means for starting the engine and for supplying fuel thereto;

Figure 3 is a front end elevational view of the engine of Fig. 1; and,

Figure 4 is a side elevational view, partly in central section, showing a modified form of the engine of Fig. 1.

The engine shown in Figs. 1, 2 and 3 has a housing 1 provided with a central passage 2 having an inlet end 3 and a discharge or exhaust end 4. This passage 2 is generally venturi-like with its most restricted portion approximately midway between the intake and exhaust ends thereof. Fixed compressor blades 5 extend from housing 1 into passage 2 at spaced intervals from near the intake end to near the constricted portion of the passage. Fixed turbine blades 5a are similarly disposed from a short distance beyond the restriction of passage 2 to a point near its discharge end.

Shaft 6 extends along the axis of passage 2 and is mounted for rotation on radial bearings 7 and thrust bearings 8. These bearings are carried by hubs 9 which are connected to housing 1 by webs 10. Shaft 6 is provided wtih a set of compressor blades 11 and a set of turbine blades 12 which cooperate with the sets of compressor and turbine blades on the housing in the conventional manner, that is, the fixed blades on the housing are spaced apart axially from each other and the blades on the shaft are positioned to rotate between the fixed blades. Fan blades 13 in the shaft 6 serve to propel cooling air thru the shaft.

Between the adjacent ends of the sets of compressor and turbine blades, wall 15 extends inwardly from housing 1 and lies closely adjacent to a correspondingly shaped wall 16 which extends outwardly from shaft 6. As shown, walls 15 and 16 are spherical in shape. These walls cooperate to form a partition in the passage 2 and to define, in conjunction with the shaft 6 and housing 1, an air preheating and compression chamber 17 on the intake side of those walls and an explosion chamber 18 on their exhaust side. Each of the walls 15 and 16 is provided with a plurality of apertures 19, in this instance two, to connect chambers 17 and 18 for the passage of compressed air from the former into the latter. It will be understood that when the shaft is rotated, air is compressed in chamber 17 when the apertures 19 are out of registry with each other and that such compressed air may flow into chamber 18 when the apertures are in registry; and also that the expansive forces of gases in chamber 18 can be opposed on the air in chamber 17 only during the time apertures are in registry.

A fuel reservoir 20 (Fig. 2) is connected thru suitable piping to a tubular ring 21 which has a plurality of outlets 22 thru which fuel may be delivered into explosion chamber 18, and also thru a bypass to an outlet in the explosion chamber. As Fig. 2 shows, reservoir 20 is connected to ring 21 by piping 25 which includes a filter 26, a pump 27, a pressure regulator 28 and a speed control valve 29. When the engine is in normal operation fuel flows from reservoir 20 to ring 21 thru parts 25 to 29 inclusive, the fuel pumped by pump 27 in excess of that passing thru valve 29 being returned from regulator 28 to reservoir 20 thru pipe 30. When the engine is to be started fuel flows from reservoir 20 thru pipe 25, filter 26, pump 27, bypass 31, primer 32, ball check 33, and into chamber 18 thru outlet 33. A spark plug 35 which is exposed to gases in explosion chamber 18 may be connected to battery 36 thru switch 37, the other side of the battery being grounded thru cable 38 to the engine. An air screw 40 is mounted on the leading end of shaft 6. If desired a shaft connected to a water screw may be operatively connected to and actuated by shaft 6. The fuel pump 27 is carried by web 10 of housing 1 and is driven by gear 41 keyed to shaft 6. An additional "stand by" pump may be mounted in web 10 if desired.

Housing 1 is surrounded by a shell 42 which is spaced outwardly from the housing to define, with the outer surface of the latter, a cooling space 43. At the forward end of the engine, this shell is provided with intake openings 44. The trailing portion of the shell has a plurality of sections 45 which are connected thereto by pivots 46 and each of these sections is pivotally connected to bi-metallic U-shaped members 47, the inner ends of which are pivotally connected, as at 48, to the housing. These members 47 are responsive to temperature variations and tend to straighten out from the shape shown, as their temperatures increase, thereby moving sections 45 about their pivots 46 and affording exhaust spaces thru which heated air may flow from space 43.

The area of the exhaust end 4 of passage 2 is enough greater than the area at any point forwardly thereof to permit such a decrease in pressure as will result in the maximum jet propulsion effect of the hot gases. When the engine is to be used as a stationary engine, the area of the exhaust end of the housing may be greatly increased so as substantially to eliminate the jet propulsion effect of the gases.

The engine shown in Fig. 4 is like that shown in Fig. 1 in many respects. In Fig. 4 the housing 50 has a passage therethru which is venturi-like. At its leading end, housing 50 is provided with a web structure 51 which carries a radial bearing 52 and a thrust bearing 53. Forwardly of the most restricted portion of the passage, housing 50 is provided with another web structure 54 which carries a radial bearing 55 and a thrust bearing 56. The housing 50 is surrounded by an air cooling casing 57 having air intake passages 58 similar to passages 44 of Fig. 3, and outlet passages 59 generally similar to intake passages 58. This casing is also provided with pivoted sections 60 and bi-metallic controllers 61 therefor, these sections and controllers being similar to parts 45 and 47 of Fig. 1. Housing 50 is provided with a plurality of removable, fixed compressor blades 65 and turbine blades 66, the compressor blades being disposed within the space beginning near the intake end of the housing and extending to a point near the preheating and compression chamber 17, and the turbine blades beginning just beyond explosion chamber 18 and extending to a point near the exhaust end of the housing. The blades 65 are seated on cylindrical surfaces 67 and at their trailing sides bear against shoulders 68 of housing 50. Similarly, turbine blades 66 are seated on cylindrical surfaces 69 and at their leading sides bear against shoulders 70 and are held in assembled position by ring 71.

Shaft 75 is hollow and open at both ends and is mounted in bearings 52, 53, 55 and 56 located in the compressor part of the engine. A plurality of compressor blades 76 with intervening spacers 77 are fitted onto shaft 75, the spacers being radially aligned with blades 65, and blades 76 being disposed to pass between fixed blades 65 when the shaft rotates. The collar 78 threaded onto the leading end of the shaft presses the blades 76 and spacers 77 into close engagement with each other and against collar 79 which abuts a shoulder 80 on shaft 75. Thus the blades 76 and spacers 77 are clamped together for simultaneous rotation with shaft 75 and rotational and thrust forces of the shaft and its blades and spacers are taken by bearings 52, 53, 55 and 56.

The turbine blades 81 and spacers 82 are similarly mounted on shaft 75 and are held in place for rotation with the shaft by ring 83 which is screw threaded onto the trailing end of shaft 75 and presses the blades and spacers against the shoulder 84 on shaft 75.

The apertured partition wall 85 corresponds to wall 16 of Fig. 1 but is integral with collar 79 which acts as an abutment for the trailing blades 76 of the compressor. Wall 88 is like wall 15 of Fig. 1. A fuel or oil pump 47 is carried by web 51 and is rotated as by gear 91 which surrounds and is keyed to shaft 75.

The compressor and turbine blades on shaft 75 and spacers 77 may be air cooled by the flow of air thru passages 95 and 96 in the walls of shaft 75 and leading into the interior of the blades and spacers.

Engines embodying the present invention may be started without difficulty by resorting to use of the bypass apparatus shown in Fig. 2. The speed controller 29 is actuated to shut off any flow of fuel therethru to ring 21, switch 37 is closed, and fuel from pump 27 is admitted into the explosion chamber by repeated, manual actuation of primer 32. At each such actuation a small quantity of fuel is delivered thru outlet 33 and is ignited by spark plug 35 with resultant production of burning expanding gases and rotation of the shaft. Such repeated injection of small amounts of fuel and the burning thereof in the explosion chamber will quickly heat the walls of that chamber to a temperature at which the combustible mixture will ignite without the aid of the spark and will increase the speed of rotation of the shaft and the compression of the air by the compressor. When the temperature of the explosion chamber walls rises to a point sufficiently high to ignite the fuel injections without the aid of spark plug 35, switch 37 may be opened and speed controller 29 may be actuated to permit fuel to flow therethru into ring 21 and thence into the explosion chamber. The speed of the engine may be controlled easily by actuating controller 29 to admit more or less fuel. It will be understood that when an engine is being started in this manner there will be intermittent explosions at first but, as the speed of the shaft increases these explosions will take place at shorter and shorter intervals due to the shorter and shorter lengths of time between the overlapping of apertures 19 and flow of compressed air therethru.

In starting prior engines of the compressor turbine type, some auxiliary means such as a gas engine has been required to rotate the compressor until the pressure in the air stream was built up sufficiently to overcome the back pressure due to the gases. The present invention makes such auxiliary starting means unnecessary.

It will be understood from the drawings and the foregoing description thereof that engines embodying the present invention may be constructed of a small number of simple parts which are easily assembled and disassembled; that the shaft as well as the housing may be efficiently cooled; and that the shaft bearings are protected from the high temperature of the burning gases by being positioned in the relatively cool compressor where they are subjected to the cooling effect of air flow past them. It will also be understood that the unique provision of a preheating and compression chamber in which air is highly compressed and periodically admitted into an explosion chamber thru apertures of smaller area than the compression chamber insures higher engine operating efficiency, as contrasted with previously proposed engines of this general type in which the air stream flows continuously from the compressor to the turbine and is at comparatively low pressure. It will be understood, as aforestated, that during the time the shaft is rotating the movable partition wall between the points where apertures 19 of the two partition walls are not in overlapping position, air drawn into the housing by the compressor will be compressed in chamber 17 and its pressure will thereby be increased considerably, also its temperature will be increased during normal operation of the engine by reason of heat transfer thereto from the explosion chamber. When the apertures 19 are in overlapping position, such preheated and compressed air will flow at high velocity into the explosion chamber where it will instantly ignite.

In prior engines of the compressor-turbine type, about half of the expansive forces of the burning fuel constantly opposed flow of air thru the compressor. In engines embodying the present invention the expansive forces of the burning fuel are only intermittently opposed to the flow of air thru the compressor, that is, when passages 19 are in registry, and even then the pressure so applied to the air is much less due to the small ratio of the area of passages 19 to the area of the compression chamber 17. When passages 19 are out of registry, all the expansive forces of the burning fuel are applied to the turbine. As a result the air is more highly compressed, the energy of the gases is applied to a greater extent to the turbine, and greater efficiencies are obtained.

Having thus described the invention so that others skilled in the art may be able to understand and practice the same, I state that what I desire to secure by Letters Patent is defined in what is claimed.

What is claimed is:

1. An engine of the compressor-turbine type comprising a housing having a passage therethru, a rotatable shaft in said passage, a set of compressor blades on the shaft and housing extending rearwardly from the intake end of said passage, a set of turbine blades on the housing and shaft extending forwardly from the discharge end of said passage, an apertured wall extending inwardly from said housing, an apertured wall extending outwardly from said shaft, said walls lying close to each other and constituting a partition across said passage, said partition defining the discharge end of a compression chamber open at the inlet end of said passage in front of said compressor blades and the inlet end of an explosion chamber open at the discharge end of said passage beyond said turbine blades.

2. An engine of the compressor-turbine type comprising a housing having a passage therethru, a rotatable shaft in said passage, a set of compressor blades on the shaft and housing extending rearwardly from the intake end of said passage, a set of turbine blades on the housing and shaft extending forwardly from the discharge end of said passage, an apertured wall extending inwardly from said housing, an apertured wall extending outwardly from said shaft, said walls lying close to each other and constituting a partition across said passage, said partition defining the discharge end of a compression chamber open at the inlet end of said passage in front of said compressor blades and the inlet end of an explosion chamber open at the discharge end of said passage beyond said turbine blades, bearings for said shaft supported by the housing at each end of said sets of compressor blades, and means to deliver fuel into said explosion chamber.

3. An engine of the compressor-gas turbine type comprising a housing having a passage therethru, a hollow shaft rotatably mounted in said passage, a set of compressor blades on the shaft and housing extending rearwardly from the intake end of said passage, a set of turbine blades on the housing and shaft extending forwardly from the discharge end of said passage, a pair of apertured, overlapping, adjacent walls on the housing and shaft between the said sets of compressor and turbine blades, said walls constituting a partition across said passage and defining in part a compression chamber and an explosion chamber on the intake and exhaust sides thereof, respectively, means to deliver fuel into said explosion chamber, and means comprising air passages thru the walls of the shaft and blades on the shaft for cooling said blades.

4. An engine of the compressor-gas turbine type comprising a housing having a passage therethru, a shaft rotatably mounted in said passage, a set of compressor blades on the shaft and housing extending rearwardly from the intake end of said passage, a set of turbine blades on the housing and shaft extending forwardly from the discharge end of said passage, an apertured wall extending inwardly from said housing, an apertured wall extending outwardly from said shaft, said walls lying close to each other and constituting a partition across said passage, said partition defining the discharge end of a compression chamber open at the inlet end of said passage in front of said compressor blades and the inlet end of an explosion chamber open at the discharge end of said passage beyond said turbine blades, means to deliver fuel into said explosion chamber, and a shell surrounding said housing and defining therewith a space having intake and exhaust openings for flow of cooling gas therethru.

5. An engine of the compressor-gas turbine type comprising a housing having an axial passage therethru, a hollow shaft in said passage, a compressor comprising a set of compressor blades on the shaft and housing extending rearwardly from the intake end of said passage, bearings for said shaft supported by said housing in said compressor, a turbine comprising a set of turbine blades on the housing and shaft extending forwardly from the discharge end of said passage, an apertured wall extending inwardly from said housing, an apertured wall extending outwardly from said shaft, said walls lying close to each other and constituting a partition across said passage, said partition defining the discharge end of a compression chamber open at the inlet end of said passage in front of said compressor blades and the inlet end of an explosion chamber open at the discharge end of said passage beyond said turbine blades, said walls having apertures of smaller area than the area of said compression chamber, and means to deliver fuel into said explosion chamber.

6. An engine of the compressor-gas turbine type comprising a housing having a passage therethru, a shaft rotatably mounted in said passage, a compressor comprising a set of compressor blades on the shaft and housing extending rearwardly from the intake end of said passage, a turbine comprising a set of turbine blades on the housing and shaft extending forwardly from the discharge end of said passage, an apertured wall extending inwardly from said housing, an apertured wall extending outwardly from said shaft, said walls lying close to each other and constituting a partition across said passage, said partition defining the discharge end of a compression chamber open at the inlet end of said passage in front of said compressor blades and the inlet end of an explosion chamber open at the discharge end of said passage beyond said turbine blades, means for starting said engine comprising means to deliver small amounts of fuel periodically to said explosion chamber, and means to ignite such fuel in said chamber, and means for supplying fuel substantially continuously to said explosion chamber when the engine is running.

BERT G. CARLSON.

REFERENCES CITED

The following references are of record in the file of this patent:

UNITED STATES PATENTS

| Number | Name | Date |
|---|---|---|
| 892,206 | Apple | June 30, 1908 |
| 1,255,852 | Bergston | Feb. 12, 1918 |
| 1,331,766 | Hemingway | Feb. 24, 1920 |
| 1,640,784 | Lorenzen | Aug. 30, 1927 |
| 1,828,782 | Morton | Oct. 27, 1931 |
| 2,073,605 | Belluzzo | Mar. 16, 1937 |
| 2,154,481 | Vorkauf | Apr. 18, 1939 |
| 2,326,072 | Seippel | Aug. 3, 1943 |

FOREIGN PATENTS

| Number | Country | Date |
|---|---|---|
| 27,019 | Great Britain | Dec. 27, 1905 |
| 29,311 | Great Britain | Dec. 16, 1910 |
| 174,179 | Great Britain | Jan. 19, 1922 |
| 347,206 | Great Britain | Apr. 16, 1931 |
| 467,630 | Great Britain | June 21, 1937 |